United States Patent [19]

Lerke et al.

[11] Patent Number: 5,043,020

[45] Date of Patent: Aug. 27, 1991

[54] METHOD FOR PRODUCTION OF PORTLAND CLINKER

[76] Inventors: Pavel P. Lerke, ulitsa Lugovaya, 4; Stanislav V. Terekhovich, ulitsa Dostoevskogo, 17; Bakhyt D. Aldiyarov, ulitsa Patrisa Lumumby, 101a; Valery V. Shnaider, 7 mikroraion, 20, kv. 58, all of Chimkent; Pavel B. Kurnikov, ulitsa Silikatnaya, 7, kv. 505, Moskovskaya oblast, Podolsk, all of U.S.S.R.; Pavel B. Kurnikov, ulitsa Silikatnaya, 7, kv. 505, Moskovskaya oblast, Podolsk, all of U.S.S.R.

[21] Appl. No.: 460,343

[22] PCT Filed: Sep. 23, 1988

[86] PCT No.: PCT/SU88/00185

§ 371 Date: May 14, 1990

§ 102(e) Date: May 14, 1989

[87] PCT Pub. No.: WO90/03343

PCT Pub. Date: Apr. 5, 1990

[51] Int. Cl.$^5$ .................................................. C04B 7/02

[52] U.S. Cl. ............................ 106/745; 106/750; 106/766

[58] Field of Search ............... 106/745, 750, 766, 767, 106/769

[56] References Cited

U.S. PATENT DOCUMENTS

| | | | |
|---|---|---|---|
| 4,220,475 | 9/1980 | Tokar et al. | 106/89 |
| 4,224,077 | 9/1980 | Olifer et al. | 106/100 |
| 4,255,201 | 3/1981 | Nudelman et al. | 106/106 |

*Primary Examiner*—William R. Dixon, Jr.
*Attorney, Agent, or Firm*—Burgess, Ryan & Wayne

[57] ABSTRACT

A method for producing portland clinker which includes the steps of calcining a mixture of raw materials, at 1,350°–1,450° C. in a reducing gaseous medium containing more than 80 mass % of carbon monoxide, said mixture containing 59.7–65.05 mass % of limestone, 32.83–39.07 mass % of phosphoric slag and 1.07–6.21 mass % of additional materials containing not less than 40 mass % of iron oxide. The calcined product is then subjected to forced cooling.

1 Claim, No Drawings

METHOD FOR PRODUCTION OF PORTLAND CLINKER

Field of the Invention

The present invention relates to production of binding materials and, more particularly, to a method for production of portland clinker.

BACKGROUND OF THE INVENTION

At present, the portland clinker is produced from a finely disintegrated and homogenized mixture of limestone (55-60 mass %) and phosphoric slag (40-45 mass %). The ratio of components in said mixture of raw materials is determined by the saturation coefficient of clinker (SC):

$$SC = \frac{CaO\,(\%) - 1.65\,Al_2O_3\,(\%) - 0.35\,FeSO_4\,(\%)}{2.8\,SiO_2\,(\%)}$$

i.e. by the degree of saturation of $SiO_2$ to $3CaO.SiO_2$.

The prepared mixture of raw materials is calcined at 1350°-1450° C. until the oxidized calcium is fixed completely in the minerals of portland clinker. Then the produced portland clinker is subjected to forced air or water cooling (SU, A, 507537, 299475).

However, the produced clinker contains phosphorus oxide (phosphorus pentoxide $P_2O_5$) in the form of a solid solution in clinker minerals which retards the setting time of cement and reduces compression strength from 15 to 20 MPa at the initial periods of hardening. This, then, leads to swelling and peeling of the exposed surfaces of fresh molded products in the course of their steaming.

There is another known method for production of portland clinker from a ground and homogenized mixture of crudes containing limestone, phosphoric slag and an aluminosilicate component by calcining (SU, A, 876580).

This partially reduces the swelling and peeling of fresh products in the course of steaming and raises their strength in the course of the first three days to 23 MPa.

Known in the prior art is a method for the production of portland clinker wherein a low-oxidizing medium at 1,450° C. a mixture of crudes containing limestone, phosphoric slag and cinder produced by calcining of pyrite, is calcined at a following ratio of components, wt %;

| | |
|---|---|
| limestone | 53-58.7 |
| phosphoric slag | 36-44 |
| cinder | 2.1-6.6 |

(S.A. Slobodchikova "Investigating a possibility of producing high-grade clinker from phosphorus-containing slags", a thesis, Cement Research Institute, 1964).

A disadvantage of this method lies in a low strength of cement after steaming (10-20 MPa) and destructive processes manifested by swelling and peeling of exposed surfaces after steaming of fresh molded products.

SUMMARY OF THE INVENTION

The main object of the present invention resides in providing adequate conditions for the formation of iron phosphides not creating solid solutions with clinker minerals thus developing a method for the production of portland clinker with higher strength of cement and eliminating the swelling of exposed surfaces of fresh molded cement products during wet-heat treatment.

This object is realized in the method for production of portland clinker comprising the preparation of a mixture of crudes based on limestone and phosphoric slag and calcining the mixture at 1350-1450° C. to fix the calcium oxide into portland clinker minerals followed by forced cooling of the produced clinker wherein, according to the invention, the mixture of crudes containing 59.7-65.05 mass % of limestone, 32.83-39.07 mass % of phosphoric slag and 1.07-6.21 mass % of additions containing more than 40 mass % of iron oxide is calcined in a reducing gas medium containing more than 80 mass % of carbon monoxide.

Owing to the present invention the strength of phosphorus-containing cement produced on the basis of the herein-disclosed clinker increases after steaming from 10.0-20.0 to 28-38 MPa. Besides, the fresh moulding surfaces of the products made from such a cement are not swelled nor peeled.

DETAILED DESCRIPTION OF THE INVENTION

The other objects and advantages of the present invention will become clear from the following detailed description of the method for the production of portland clinker and examples of the same.

The portland clinker is produced, according to the disclosed invention, from a lime-containing compound (limestone), phosphoric slag and additions containing over 40 mass % of iron oxide.

Limestone is a dense rock consisting of calcite and and admixtures of oxides of silicon, magnesium, aluminium and iron. The chemical composition of limestone suitable for use, according to the present invention, may be as follows: silicon oxide 0.5 pts wt, aluminium oxide 0-2 pts wt, iron oxide 0-2 pts wt, calcium oxide 50-55 pts wt. The loss from calcining ($CO_2$) amount to 36-42pts wt.

The phosphoric slag used as a source of a silica-containing component in the disclosed invention is a by-product of the electrothermal production of yellow phosphorus.

With respect to its chemical composition the phosphoric slag consists, as a rule, of 38-45 mass % of silicon oxide, 2-5 mass % of aluminium oxide, 0.1-0.5 mass % of iron oxide, 38-52 mass % of calcium oxide, 2-5 mass % of magnesium oxide, 0.5-3.0 mass % of phosphorus oxide, 1-3 mass % of fluorine, 0.1-0.3 mass % of manganese oxide.

With respect to its mineralogical composition, the granular phosphoric slag consists of 80-85 mass % of glass phase of a wollastonite composition, and 7-10 mass % of wollastonite, 5-7 mass % of miliolite, 3-5 mass % of akermanite and 2-3 mass % of iron and manganese phosphides. In a crystallized state the phosphoric slag consists of 60-70 mass % wollastonite, 20-30 mass % of miliolite, 10-15 mass % of akermanite and 10-20 mass % of cuspidine.

The iron-containing addition is constituted by cinder which is the product of oxidizing calcined pyrite ($FeS_2$) obtained in the process of sulphuric acid production, and slags formed in the production of such nonferrous metals as lead, zinc, coppper.

The chemical composition of cinder is as follows: 7.2 mass % silicon oxide, 2.9 mass % aluminium oxide, 72.6 mass % iron oxide, 5.63 mass % calcium oxide, 4.6 4.66 mass % sulphur trioxide. The mineralogical composition of pyrite cinder is: 70–76 mass % hematite and 24–30 mass % glass on the basis of low-base aluminoiron silicates of calcium.

The pyrite cinder may be constituted by any kind of industrial waste containing not less then 40% of $Fe_2O_3$. If the iron-containing addition contains less than 40 mass %, this will cause destructive processes during steaming of cement and reduce the reaction ability of the mixture of crude materials since the proportion of phosphoric slag in the mixture of crudes is reduced.

The slags of nonferrous metallurgy are the waste product of lead, zinc and copper metallurgy. With respect to their chemical composition the slags of nonferrous metallurgy consist, as a rule, of 21–28 mass % silicon oxide, 12–22 mass % aluminium oxide, 40–60 mass % iron oxide, 5–10 mass % calcium oxide, 4–20 mass % magnesium oxide. The line-containing component, phosphoric slag and iron-containing additions shall be finely ground. This purpose is reached usually by using conventional grinding apparatuses such as ball and air-stream mills.

The standard of grinding of the above-mentioned components of the mixture of raw materials is checked by the sieve residue of 10–18% for sieve mesh of 80μm and 1–3% for sieve mesh of 200μm.

Grinding of raw-material components may be achieved by wet and dry processes. In the wet grinding method, the above-mentioned components are ground in the presence of water after which the mixture of raw materials is homogenized and stored in the form of suspension (slime) with a moisture content of 28–35%.

In dry grinding of the above-mentioned components of the mixture of crudes, the material is ground without addition of water. In this case homogenization of components is more difficult.

The disclosed method for the production of portland clinker comprises calcining the source components at a temperature of 1350–1450° C. The calcined mixture of crudes contains 59.7.0–65.05 mass % of limestone, 32.83–39.07 mass % of phosphoric slag, 1.07–6.21 mass % of additions, containing more than 40 mass % of iron oxide.

If the above-stated amount of limestone in the mixture of crudes diminishes, it should be made up by a corresponding increase of the above-mentioned content of phosphoric slag, i.e. 32.83–39.07 mass %, which results in a lower strength.

If the content of limestone is increased above 65.05 mass % with a corresponding reduction of phosphoric slag content (below 32.83 mass %), the strength of the end product is impaired and the process of clinker production becomes more expensive.

The content of iron-containing addition in the mixture in excess of 6.21 mass % increases consumption of fuel for calcining.

If the content of iron-containing additions is less than 1.07 mass %, the cement specimens become swelled and peeled after steaming because there is an insufficient amount of reduced iron which fixes the reduced phosphorus into iron phosphide.

In accordance with the disclosed invention, said mixture of raw materials is calcined in a reducing gaseous medium containing more than 80 mass % of carbon monoxide at a temperature of 1350–1450° C. During calcining of the mixture of crudes and the calcium oxide is fixed into portland clinker minerals.

As has been stated above the calcining temperature of the source components shall not be under 1350° C. Otherwise the produced clinker will have an increased proportion of chemically free calcium oxide which goes together with a reduction of cement strength.

Raising the calcining temperature above 1,450° C. results in excessive consumption of fuel. In this case a reduction of carbon monoxide content (less than 20 mass %) in the gaseous medium brings about oxidation of iron and manganese phosphides and formation of phosphorus pentoxide which, penetrating into the crystalline lattice of clinker minerals, during hydration of cement creates a gelatinous shell of calcium phosphates around the cement particles, said shell preventing water from penetrating into the depth of particles and thus halting the hardening of cement.

After calcining of charge under the above-specified condition the produced clinker is subjected to forced cooling with a stream of air or in water. The forced air-stream cooling produces grey portland clinker which is utilized, as a rule, for the production of precase reinforced concrete in the capacity of a sulphate-resistant, low-hydration-heat cement in water-engineering construction for cementing oil and gas wells and making asbestos-cement products.

In this case the air used for clinker cooling is heated to 500–600° C. and is used for burning of fuel thus reducing its consumption.

The disclosed invention makes it possible to produce portland clinker with universal building characteristics. The produced portland clinker contains 5 to 7 mass % of the intermediate phase represented by calcium aluminates. The aluminate phase is represented not only by tricalcium aluminate ($3CaO.Al_2O_3$) but also by a hydraulically more active halogen-containing aluminate phase—$11CaO.7Al_2O_3.CaF_2$.

The high amount of allite (80–90 mass %) in clinker produced by the disclosed method and the presence in it, as stated above, of a more hydraulically active aluminate phase increases the strength of cement by 3.5–5 Pa.

Now the invention will be described in further detail by way of the following examples:

EXAMPLE 1

The following components are ground, homogenized and mixed: 59.7 kg of limestone, 39.07 kg of phosphoric slag and 39.07 kg of pyrite cinder containing 79.6 mass % of $Fe_2O_3$ to a sieve residue of 10–20% on sieve mesh 80μm and 2% on sieve mesh 200μm.

The prepared mixture is calcined in a kiln in a reducing gaseous medium containing 80 mass % of carbon monoxide at a temperature of 1300–1350° C. In the course of calcining the calcium oxide formed by decomposition of limestone is fully fixed into clinker minerals: allite, bellite and calcium aluminates.

The obtained product, portland clinker, cooled under an air stream is ground to produce portland cement. Grinding is done in presence of 3–5 mass % of gypsum.

The plastic solution of the produced portland cement is used to mold specimens 4×4×16 cm in size at a cement-to-sand weight ratio of 1:3 and water-cement ratio of 0.4. The prepared specimens are cured for 2 hrs then steamed.

Examination of specimens shows that the destructive phenomena caused by peeling and swelling of the exposed surface of specimens are absent. The program of strength tests of the produced specimens after steaming consisted of two hours curing the fresh molded products before steaming, three hours heating to 80–95° C., six hours isothermic curing at 80–95° C. and three hours cooling to room temperature. The compression strength was 28 MPa.

EXAMPLE 2

A mixture of raw materials consisting of 65.05 kg of limestone, 32.83 kg of phosphoric slag and 2.12 kg of pyrite cinder containing 79.6 mass % of $Fe_2O_3$ is prepared for calcination as follows.

All the above-mentioned components of the mixture of raw materials are ground and mixed thoroughly. The degree of disintegration is checked by the sieve residue which should be 10–20% for 80$\mu$m mesh and 1–3 % for 200$\mu$m mesh.

The prepared mixture of crudes is calcining in a reducing gaseous atmosphere containing 90 mass % of carbon monoxide at 1400–1450° C.

The portland clinker produced in the kiln by calcining force-cooled with water.

The portland cement produced from this clinker does not display destructive phenomena after steaming of fresh-molded products in the form of swelling and peeling of exposed surfaces.

The bending strength of the produced cement tested in a plastic mortar at a water-cement ratio of 0.4 after two days of wet-air hardening is 38 MPa.

EXAMPLE 3

A mixture of raw materials containing 64.31 kg of limestone, 34.62 kg of phosphoric slag and 1.07 kg of cinder containing 79.6 mass % of iron oxide is prepared for calcining as follows.

All the above-mentioned components of the mixture of raw materials are ground and mixed thoroughly.

The degree of disintegration of components is checked by the sieve residue which should be 10–20% on sieves of 80$\mu$m mesh and 1–3% on sieve of 200$\mu$m mesh.

The prepared mixture is calcined in a reducing gaseous medium containing 82 mass % of carbon monoxide at 1400–1450° C.

The portland clinker produced by calcination in a kiln is subjected to forced water cooling.

The portland cement produced from the given clinker does not display any destructive phenomena such as swelling and peeling of exposed surfaces after steaming of fresh-molded products.

The bending strength of the produced cement tested in a plastic mortar and a water-cement ratio of 0.4 after two days of wet-air hardening is 30.5 MPa.

EXAMPLE 4

A mixture of raw materials containing 60.02 kg of limestone, 33.77 kg of phosphoric slag and 6.21 kg of slags obtained in the production of lead, containing 46 mass % of iron oxide is prepared and calcining under the conditions similar to those given in Example 3.

However, the gaseous medium during calcinatin contains 80 mass % of carbon monoxide.

The portland cement produced from clinker formed after calcined and subsequent forced cooling does not display any destructive phenomena after steaming of fresh-moulded products.

The bending strength of the produced cement during tests in a plastic mortar and a water-cement ratio of 0.4 after two days of wet-air hardening is 32.5 MPa.

EXAMPLE 5

A mixture of raw materials containing 64.23 kg of limestone, 30.14 kg of phosphoric slag and 5.63 kg of lead slags with an iron oxide content of 46 mass % is prepared and calcined under the conditions described in Example 3.

Portland cement produced from the clinker formed by calcination and subsequent forced cooling does not display any destructive phenomena after steaming of fresh-moulded products.

The compression strength of the produced cement tested in a plastic mortar and a water-cement ratio of 0.4 after two days of wet-air hardening is 45 MPa.

INDUSTRIAL APPLICABILITY

The invention will prove its worth in the production of cement possessing multipurpose building properties, namely: sulphate-resistant and low-temperature portland cement used for water-engineering construction (canals, dams); as grouting cement for hot and cold wells; high-strength portland cement used in the construction of load-bearing reinforced-concrete structures.

We claim:

1. A method for producing portland clinker comprising:
    preparing a mixture of raw materials comprising 59.7–65.05 weight % of limestone, 39.07–32.83 weight % of phosphoric slag and 1.07–6.21 weight % of a material containing not less than 40 weight % of iron oxide;
    calcining said mixture at 1,350–1,450° C. in a gaseous medium containing more than 80 weight % of carbon monoxide to thereby fix the calcium oxide into minerals of portland clinker; and
    force cooling the resulting portland clinker.

* * * * *